May 16, 1967  A. GEORGE  3,320,023
PREPARATION OF REFRACTORY METAL CHLORIDES
Filed Sept. 10, 1963
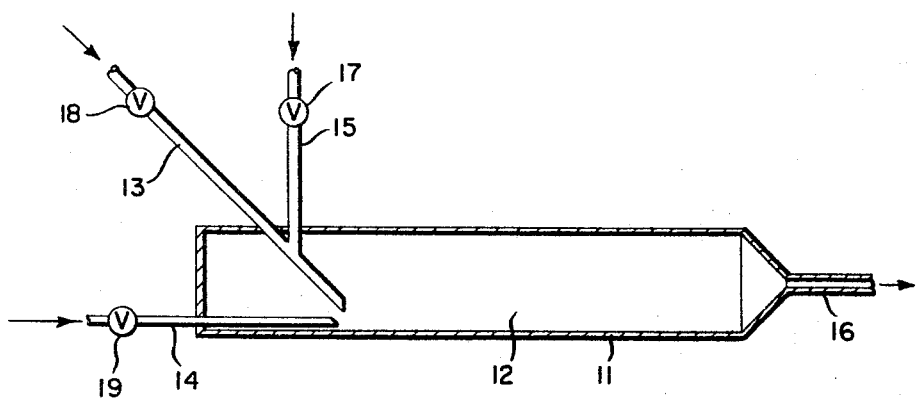
INVENTOR
ANGELO GEORGE
BY *James J. Flynn*
ATTORNEY

3,320,023
PREPARATION OF REFRACTORY METAL CHLORIDES

Angelo George, Wayne, N.J., assignor to E. I. du Pont de Nemours and Company, Wilmington, Del., a corporation of Delaware
Filed Sept. 10, 1963, Ser. No. 307,821
3 Claims. (Cl. 23—16)

This invention relates to a process for preparing metal chlorides and, more particularly, to a process for chlorinating refractory metal oxides found in oxidic ores to the corresponding refractory metal chlorides.

Many processes are known for obtaining refractory metal chlorides by chlorinating ores containing refractory metal oxides. One of the most frequently used procedures involves a static bed process in which the metal-bearing ore is mixed with a carbonaceous reducing agent, the mixture most often being agglomerated into pellets for ease of handling; and passing a chlorine-containing gas over or through the bed of agglomerated material. Numerous difficulties are encountered in carrying out chlorination reactions under these conditions. Among these are the problems of handling the pellets which are very easily broken and which tend to crumble as the chlorination reaction proceeds; the difficulty of avoiding localized overheating of the bed which will cause sintering of the charge; problems related to build-up of impurities in the static bed; and the difficulty of obtaining sufficient surface in the ore-bearing compacts to permit good utilization of the chlorinating agent. In addition, many ores contain relatively large amounts of alkali and alkaline earth metals which form chlorides whose melting points are within the operating range of the chlorination process. These melted chlorides result in additional difficulties in operation of the chlorination process because, among other things, the chlorides cause the ore pellets to stick together so that there is even less exposure of the ore-carbon pellets to the chlorinating gas.

Fluid bed processes involving chlorinating oxidic ores have also been used for the production of refractory metal chlorides. However, fluid bed type procedures have not been entirely satisfactory. For example, here too, a major problem in the process occurs due to the presence of alkali or alkaline earth metals in the particles of ore that are being treated, because these metals form relatively low-melting chlorides upon chlorination of the oxidic ore, thus causing the particles of ore to adhere together. Also, the efficient operation of a fluid bed process depends upon accurate control of gas and ore feeds and control of the reactor temperature within close tolerances. Maintenance of conditions of operation so that temperatures and feed rates are under control at all times makes the operation of a fluid bed process most difficult. Back-mixing of the product with the reactants is characteristic of fluidized bed operations and thus prevents the attainment of equilibrium yields in reasonably sized equipment. Further complications often arise in the operation of either a static or a fluid bed operation because of dusting of feed, plugging of the reactor, or channeling effects.

An object of the present invention, therefore, is to provide a process for preparing refractory metal chlorides from ore containing refractory metal oxides by a chlorination process that is simple to operate and easy to control. A further object of the invention is to provide a process that results in substantially complete chlorination of the refractory metal oxides in oxidic ore to the corresponding chlorides. Another object is to provide a chlorination process that is self-sustaining and does not require an external source of heat. These and other objects will become apparent from the following complete description of the invention.

It has been discovered that refractory metal oxides contained in oxidic ores can be chlorinated to the corresponding refractory metal chloride and the chlorides recovered when acetylene is utilized as the reducing agent in the chlorination reaction. During the process, substantially complete chlorination of the refractory metal oxides occur. The process of this invention involves adding to a reaction vessel and reacting an ore containing a refractory metal oxide with acetylene and chlorine. The chlorination reaction of the instant invention can be illustrated by reference to the following equations wherein the refractory oxides are represented by niobium pentoxide and tantalum pentoxide:

(1) 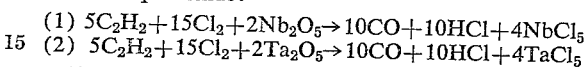
$5C_2H_2 + 15Cl_2 + 2Nb_2O_5 \rightarrow 10CO + 10HCl + 4NbCl_5$
(2) $5C_2H_2 + 15Cl_2 + 2Ta_2O_5 \rightarrow 10CO + 10HCl + 4TaCl_5$ Since all known ores containing niobium and tantalum also contain appreciable amounts of other metals, and especially iron, other reactions, of course, take place simultaneously with the reactions noted above. Iron, for example, is believed to be reacted in the process according to the following equation:

(3)  $3C_2H_2 + 9Cl_2 + 2Fe_2O_3 \rightarrow 6CO + 6HCl + 4FeCl_3$

These reactions result in essentially complete conversion of the metal oxide values in the ore to chlorides. The metal chlorides thus formed are condensed outside the reactor and separated from the off-gas stream composed of carbon monoxide and hydrogen chloride. The essentially pure anhydrous hydrogen chloride may also be condensed and removed from the carbon monoxide gas stream for further use.

Reference is now made to the drawing illustrating a suitable apparatus for conducting the process in accordance with the invention. The apparatus shown in FIGURE 1 comprises a suitable refractory reactor 11, having reaction chamber 12 constructed from a suitable material, for example silica, that is resistant to the action of chlorine and hydrogen chloride. There may be supplied, if desired, a means, such as a jacket surrounding the reactor for regulating the temperature in the reaction chamber (not shown). Inlet tubes used for introducing chlorine and acetylene are indicated at 13 and 14, respectively, and inlet means for supplying ground oxidic ore into the gas feed line is shown at 15. The opening in the reactor at outlet 16 permits collection of the metal chloride reaction products. Valves 17, 18 and 19 are provided for controlling and regulating the ore and gas flows, i.e., acetylene and chlorine, to the reaction chamber 12. If desired, the ore may be fed to the reactor through a separate inlet line rather than with one of the feed gases as would be the case in the form of reaction shown in the drawing. The preferred method, however, is to feed the ore and one of the reactant gases through a single inlet. This method of operation provides a means of mixing ore and gas feeds and also serves as an efficient means for conveying of the ground ore into the reactor.

The refractory metal oxides contained in the oxidic ores which may be reduced to the corresponding chloride and to which this invention is applicable are the refractory metal oxides comprising Groups IVB and VB of the Periodic Table; i.e., titanium, zirconium, hafnium, vanadium, niobium and tantalum. The process is particularly adapted to the treatment of ores such as columbite which contains niobium and tantalum. The ore may be chlorinated in a course or finely ground state, for example, the ore may be ground to about 100 mesh. The chlorinating agent used in the process is preferably gaseous chlorine. However, other chlorinating agents such as phosgene can be used.

In order to initiate the process the reaction chamber may be pre-heated by any suitable means to a temperature of the order of 600° C. to 700° C. The reactants are then added at such a rate that sufficient heat is evolved from the reaction itself to maintain an adequate reaction tempertaure. In view of the fact that the chlorination reaction is highly exothermic, once the reaction is initiated at about this temperature, it does not require an external source of heat for completion. In other words, the exothermic heat of reaction is sufficient to maintain a self-sustaining reaction that effects substantially complete chlorination of the metal oxides. The reaction temperature may be maintained by regulating the rate of introduction of ore, acetylene and chlorine into the reaction chamber to permit substantially complete chlorination of the refractory metal oxides. If the temperature begins to decrease below about 600° C. the rate of introduction of ore, acetylene and chlorine may be increased in order to increase the temperature. Once the reaction is initiated at about 600–700° C. the temperature may increase quite rapidly in view of the heat evolved during the reaction. If still further increase in the temperature of operation of the process is desirable, this may be effected by introducing oxygen with the chlorine into the reaction chamber. Quantities of the order of 3% to 30% by volume of oxygen based on the weight of the chlorinating gas are suitable.

The following example illustrates the invention in more detail as applied to Nigerian columbite ore. Other ores containing refractory metals may be treated in a similar manner.

EXAMPLE 1

The ore which was used was Nigerian columbite having the following analysis by weight: 50.0% Nb, 3.8% Ta, 12.03% Fe, 2.72% Mn, 0.45% Ti, 0.45% Sn. The ore was ground until 94.5% was in the −48, +200 mesh size (U.S. Standard Sieve Scale). The apparatus which was used to carry out this experiment is shown in the drawing. The reaction chamber 12 was brought to a dull red heat, about 700° C. The flow of gaseous chlorine was turned on first, followed by the flow of acetylene. These gases were introduced at flow rates of about 3.2 liters per minute for the acetylene, and about 7.7 liters per minute for the chlorine. A self-sustaining reaction was initiated and the gases burned to give off the bright white light at a point about ½-inch from the point of mixing of the gases. After about five seconds, black smoke was given off at the nozzle of the reactor. This was found to be carbon black. The ore feed was then started, and the smoke at the nozzle of the reactor became gray, then pure white. The flow of acetylene into the reactor was continued at a rate of about 3.15 liters per minute, and the flow of chlorine to the reactor at a rate of about 7.7 liters per minute. The rate of ore feed was maintained at approximately 12 grams per minute. About 15 seconds after the beginning of the ore addition to the reactor, the reaction zone was seen to move to the outside of the reactor, close to the reactor exit tube. Over a period of 9½ minutes, 112 grams of Nigerian ore were fed to the reactor. No unreacted ore was seen in the area nor collected with the resultant chlorides. The chlorides resulting from this reaction were condensed by introducing the discharge from the reactor into a space condenser. 209 grams of chloride were collected from this operation. Calculated on the basis of the total Nb, Ta, and Fe values of the ore fed to the reactor, this represents a 96.2% yield.

Utilizing acetylene as the reducing agent in the process has the additional advantage of eliminating difficulties encountered when coke is used in chlorination processes. In procedures involving coke, it has been necessary to process the coke in some manner, for example, heating, screening, grinding, etc., before it can be used. These expensive and time consuming steps are not necessary when acetylene is used. Furthermore, the presence of hydrogen chloride formed during the reaction using acetylene promotes complete chlorination of the oxidic ore.

I claim:
1. A process for preparing refractory metal chlorides which comprises adding to a reaction chamber previously heated to a temperature ranging from 600° C. to 700° C. and reacting therein (1) ore containing a refractory metal oxide selected from the group consisting of titanium, zirconium, hafnium, vanadium, niobium and tantalum and mixtures thereof, (2) acetylene, and (3) chlorine, introducing said reactants at such a rate that sufficient heat is evolved from the reaction to maintain a self-sustaining exothermic reaction with hydrogen chloride formation to promote and complete chlorination of said oxidic ore, and recovering the resulting metal chlorides.

2. A process for preparing niobium chloride from oxidic ore which comprises adding to a reaction chamber previously heated to a temperature ranging from 600° C. to 700° C. and reacting therein (1) ore containing nibium oxide, (2) acetylene, and (3) chlorine, introducing said reactants at such a rate that sufficient heat is evolved from the reaction to maintain a self-sustaining exothermic reaction with hydrogen chloride formation to promote and complete chlorination of said oxidic ore, and recovering the resulting niobium chloride.

3. A process for preparing tantalum chloride from oxidic ore which comprises adding to a reaction chamber previously heated to a temperature ranging from 600° C. to 700° C. and reacting therein (1) ore containing tantalum oxide, (2) acetylene, and (3) chlorine, introducing said reactants at such a rate that sufficient heat is evolved from the reaction to maintain a self-sustaining exothermic reaction with hydrogen chloride formation to promote and complete chlorination of said oxidic ore, and recovering the resulting tantalum chloride.

References Cited by the Examiner

UNITED STATES PATENTS

| | | | |
|---|---|---|---|
| 2,868,622 | 1/1959 | Bennett et al. | 23—87 |
| 2,928,724 | 3/1960 | Mason et al. | 23—87 |
| 3,212,847 | 10/1965 | Lerner | 23—17 |

OSCAR R. VERTIZ, *Primary Examiner.*

H. T. CARTER, *Assistant Examiner.*